US008651131B2

(12) United States Patent
Wu

(10) Patent No.: US 8,651,131 B2
(45) Date of Patent: Feb. 18, 2014

(54) CONTROL VALVE FOR AIR CUSHION BED

(76) Inventor: Shang-Neng Wu, Pingzhen (TW)

( * ) Notice: Subject to any disclaimer, the term of this patent is extended or adjusted under 35 U.S.C. 154(b) by 88 days.

(21) Appl. No.: 13/353,619

(22) Filed: Jan. 19, 2012

(65) Prior Publication Data

US 2013/0186480 A1 Jul. 25, 2013

(51) Int. Cl.
*F16K 37/00* (2006.01)

(52) U.S. Cl.
USPC .................................... 137/228; 200/83 W

(58) Field of Classification Search
USPC .................. 137/225, 228; 200/83 W; 73/708
See application file for complete search history.

(56) References Cited

U.S. PATENT DOCUMENTS

| | | | | |
|---|---|---|---|---|
| 1,712,657 | A * | 5/1929 | Frankenberg | 200/83 W |
| 1,805,397 | A * | 5/1931 | Harris | 137/228 |
| 1,903,233 | A * | 3/1933 | Gille | 137/225 |
| 2,075,305 | A * | 3/1937 | Sayre | 200/83 W |
| 2,270,608 | A * | 1/1942 | Sandberg | 200/83 W |
| 2,742,544 | A * | 4/1956 | Lovick | 200/83 W |
| 2,827,773 | A * | 3/1958 | Detjen | 200/83 W |
| 3,154,652 | A * | 10/1964 | Gilman | 200/83 W |

* cited by examiner

*Primary Examiner* — Craig Schneider
*Assistant Examiner* — Craig J Price
(74) *Attorney, Agent, or Firm* — Chun-Ming Shih

(57) ABSTRACT

A control valve for an air cushion bed includes a first main body, a membrane plate, a second main body, a sensor, and a depressurization unit. The membrane plate is clamped between the first main body and the second main body. The second main body at one side of the membrane plate is connected with the sensor. The sensor is used to detect the inputted air pressure. When the air is over, the air can be depressurized by the depressurization unit. The control valve of the present invention is applied to input and control the air of the air cushion bed, having depressurization and air detection functions.

8 Claims, 7 Drawing Sheets

CONTROL VALVE FOR AIR CUSHION BED

BACKGROUND OF THE INVENTION

1. Field of the Invention

The present invention relates to a control valve for an air cushion bed, and more particularly to a control valve having depressurization and air detection functions for an inflatable air cushion bed.

2. Description of the Prior Art

When a patient lies on the bed for a long period time, he/she may get bedsores caused by unrelieved pressure. An air cushion bed is used for patients so as to prevent a bedsore. This air cushion bed has air strips at the middle portion thereof for air inflation and air exhaust so as to lower the probability of bedsore. The relief of pressure is to avoid further sores.

As shown in FIG. 1, a conventional control valve 9 for an air cushion bed comprises an air intake pipe 91, an air bag 92, two push plates 93 and a three-way pipe 94. When the air enters the air bag 92 to inflate the air bag 92, the two push plates 93 will be moved to activate an inductive switch. Sometimes, the traditional air bag 92 cannot run exactly to influence the inductive result due to its material and configuration. Besides, the conventional control valve 9 has to cooperate with the three-way pipe 94. It is necessary to improve the entire effect and to lower the cost.

Accordingly, the inventor of the present invention has devoted himself based on his many years of practical experiences to solve these problems.

SUMMARY OF THE INVENTION

The primary object of the present invention is to provide a control valve for an air cushion. The control valve has depressurization and air detection functions.

In order to achieve the aforesaid object, the control valve for an air cushion bed of the present invention comprises a first main body, a membrane plate, a second main body, a sensor, and a depressurization unit.

The first main body has a first room, a first air chamber, a second air chamber and a fourth air chamber which communicate with each other. The first main body comprises a first pipe and a second pipe. The first pipe communicates with the first air chamber. The second pipe communicates with the second air chamber. The first main body further has a separate third air chamber which is located close to the fourth air chamber. The third air chamber communicates with a third pipe. The first main body has a first annular recess at an inner edge thereof.

The membrane plate is located between the first main body and the second main body. The membrane plate comprises a main membrane portion and an extension portion. The main membrane portion has a circle shape corresponding to the first room. The extension portion has a through hole corresponding in position to the fourth air chamber. The extension portion further has a hole at an outer end thereof. The hole corresponds in position to the third air chamber. The membrane plate has an annular press portion around an outer wall thereof. The annular press portion is placed in the first annular recess of the first main body.

The second main body has a second annular recess at an inner edge thereof. The second annular recess corresponds to the first annular recess of the first main body, so that the membrane plate is sealed between the first main body and the second main body. The second main body has a second room corresponding to the first room of the first main body. The sensor is disposed in the second room. The second main body comprises a depressurization pipe. The depressurization unit is disposed in the depressurization pipe to adjust pressure. The depressurization pipe communicates with an air pipe to exhaust air.

The sensor can be a micro switch. The sensor has a trigger portion. The trigger portion faces the main membrane portion of the membrane plate. When the air enters the first room, the main membrane portion of the membrane plate will be deformed to touch the trigger portion of the sensor. The trigger portion is retracted by the applied force. The sensor detects entrance of air and sends an electronic signal.

The depressurization unit comprises a valve body, an elastic member, a central post, a fixing sleeve, and an adjustment bolt. The adjustment bolt can be turned to change the position of the valve body so as to adjust the pressure of depressurization.

The first pipe comprises a first auxiliary pipe which is perpendicular to the first pipe. The second pipe comprises a second auxiliary pipe which is perpendicular to the second pipe. When in practice, one of the first pipe and the first auxiliary pipe and one of the second pipe and the second auxiliary pipe are selected for pipe fitting, preventing the pipes from being bent. The air pipe communicates with a fifth air chamber of the second main body. The fifth air chamber communicates with the third air chamber through the hole of the membrane plate. The third air chamber communicates with the third pipe. When in practice, one of the air pipe and the third pipe is selected as an air output for depressurization.

The advantage of the present invention is that the control valve has depressurization and air detection functions to improve the shortcomings of the conventional depressurization structure and to enhance the speed and accuracy of assembly.

DETAILED DESCRIPTION OF THE PREFERRED EMBODIMENTS

Embodiments of the present invention will now be described, by way of example only, with reference to the accompanying drawings.

Figure 1:
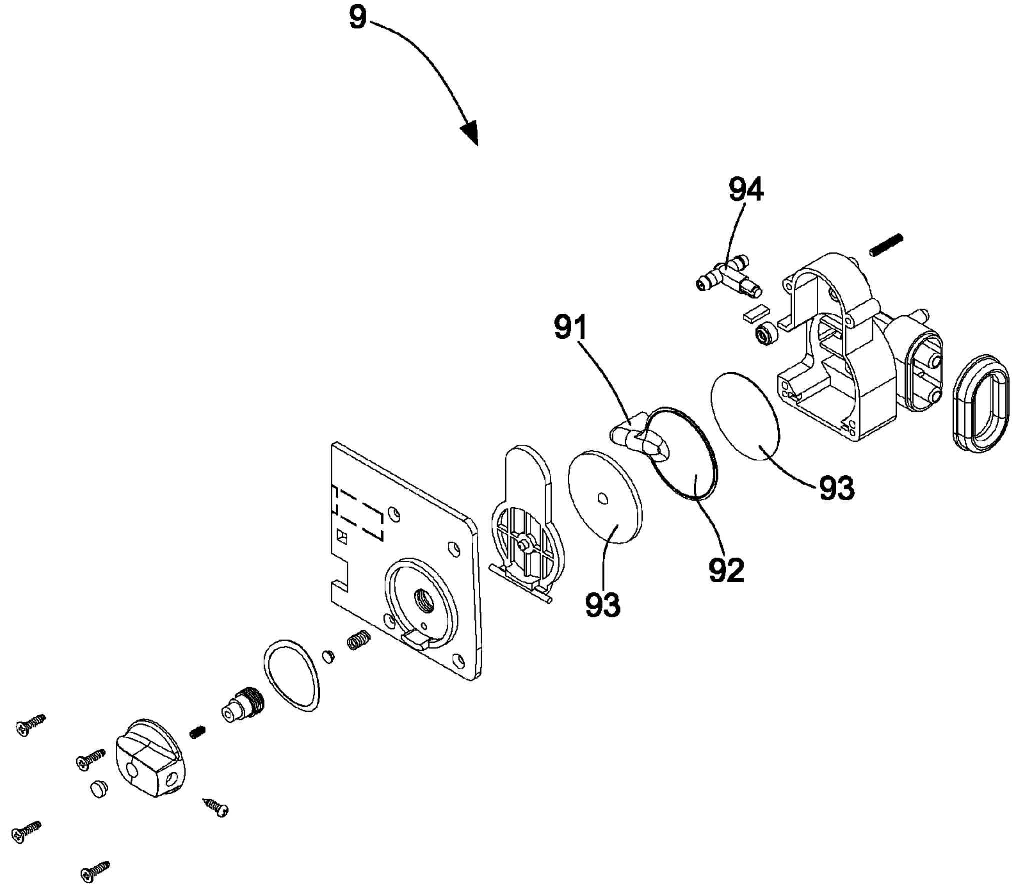
Fig.1 (Prior Art)
FIG. 1 is an exploded view of a conventional control valve.
Figure 2:
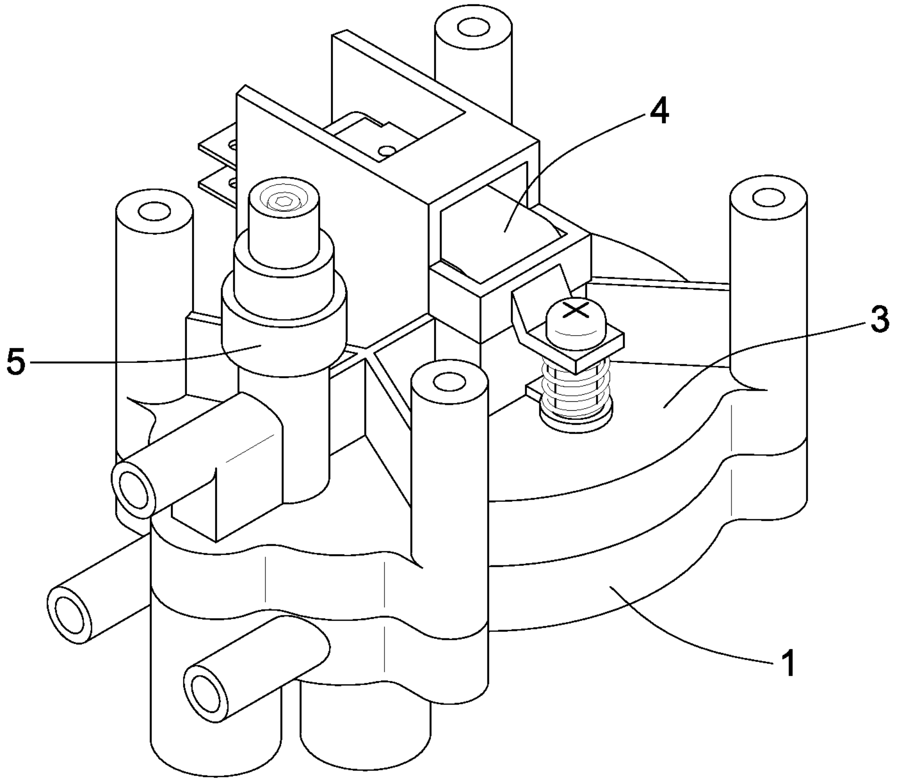
FIG. 2 is a perspective view of the present invention.
Figure 3:
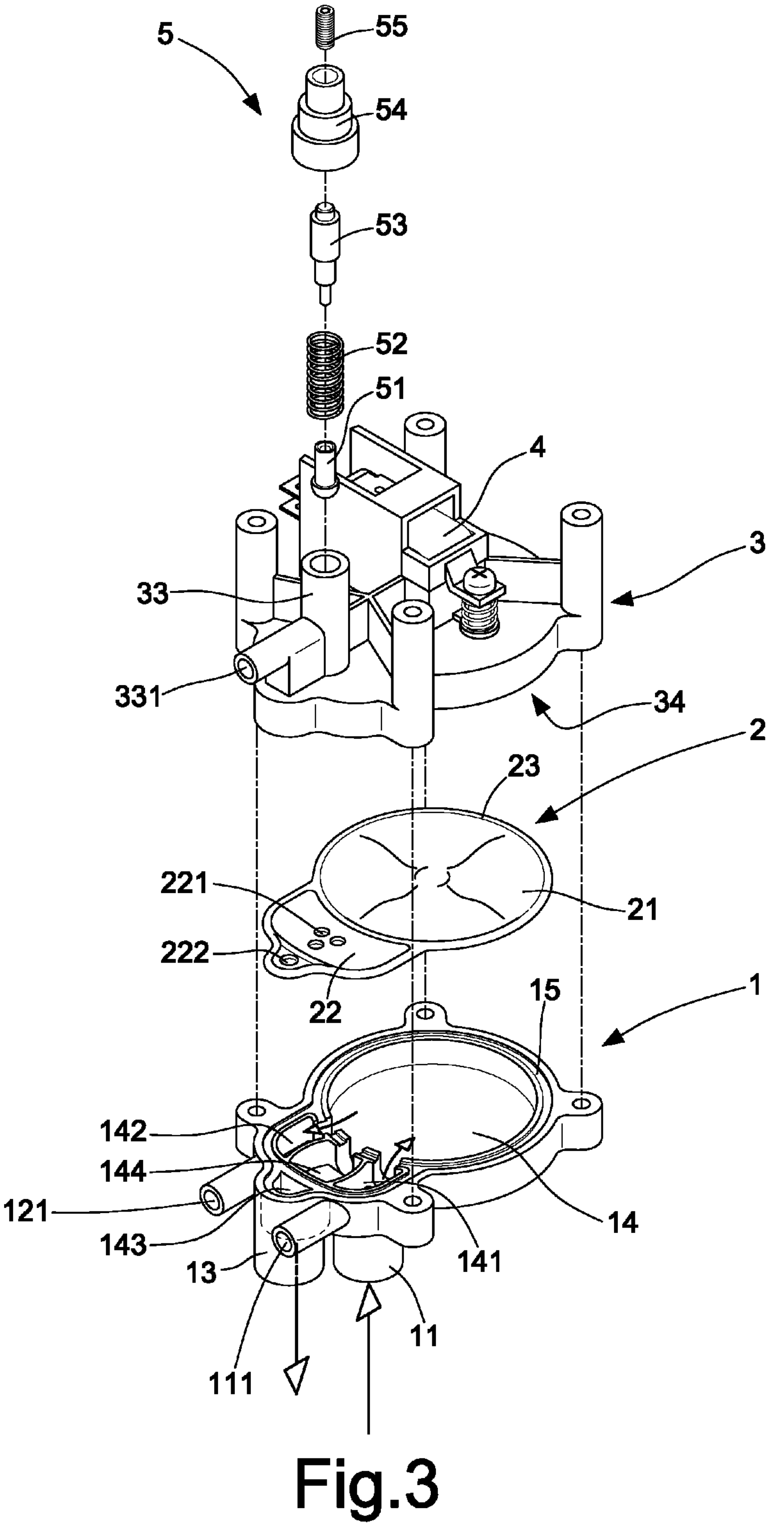
FIG. 3 is an exploded view of the present invention.
Figure 4:
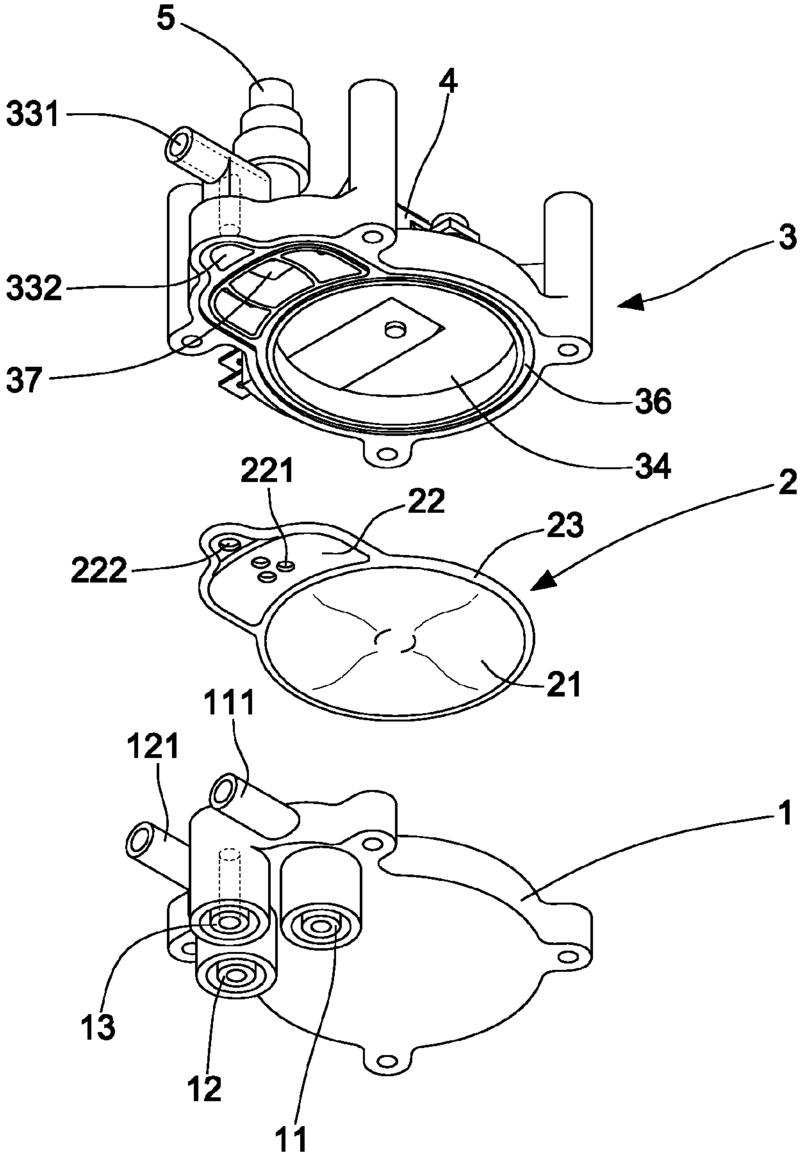
FIG. 4 is another exploded view of the present invention.

As shown in FIG. 2 through FIG. 4, the control valve for an air cushion bed according to a preferred embodiment of the present invention comprises a first main body 1, a membrane plate 2, a second main body 3, a sensor 4, and a depressurization unit 5.

The first main body 1 has a first room 14, a first air chamber 141, a second air chamber 142 and a fourth air chamber 144 which communicate with each other. The first main body 1 comprises a first pipe 11 and a second pipe 12. The first pipe communicates with the first air chamber 141. The second pipe 12 communicates with the second air chamber 142. The first main body 1 further has a separate third air chamber 143 which is located close to the fourth air chamber 144. The third air chamber 143 communicates with a third pipe. The first main body 1 has a first annular recess 15 at an inner edge thereof.

The membrane plate 2 is located between the first main body 1 and the second main body 3. The membrane plate 2 comprises a main membrane portion 21 and an extension portion 22. The main membrane portion 21 has a circle shape corresponding to the first room 14. The extension portion 22 has a through hole 221 corresponding in position to the fourth air chamber 144. The extension portion 22 further has a hole 222 at an outer end thereof. The hole 222 corresponds in position to the third air chamber 143. The membrane plate 2 has an annular press portion 23 around an outer wall thereof. The annular press portion 23 is placed in the first annular recess 15 of the first main body 1.

The second main body 3 has a second annular recess 36 at an inner edge thereof. The second annular recess 36 corresponds to the first annular recess 15 of the first main body 1, so that the membrane plate 2 is sealed between the first main body 1 and the second main body 3. The second main body 3 has a second room 34 corresponding to the first room 14 of the first main body 1. The sensor 4 is disposed in the second room 34. The second main body 3 comprises a depressurization pipe 33. The depressurization unit 5 is disposed in the depressurization pipe 33 to adjust pressure. The depressurization pipe 33 communicates with an air pipe 331 to exhaust air.

The sensor 4 can be a micro switch. The sensor 4 has a trigger portion 41. The trigger portion 41 is exposed out of the second room 34 and faces the main membrane portion 21 of the membrane plate 2.

The depressurization unit 5 comprises a valve body 51, an elastic member 52, a central post 53, a fixing sleeve 54, and an adjustment bolt 55. The adjustment bolt 55 can be turned to change the position of the valve body 51 so as to adjust the pressure of depressurization.

The first pipe 11 comprises a first auxiliary pipe 111 which is perpendicular to the first pipe 11. The second pipe 12 comprises a second auxiliary pipe 121 which is perpendicular to the second pipe 12. When in practice, one of the first pipe 11 and the first auxiliary pipe 111 and one of the second pipe 12 and the second auxiliary pipe 121 are selected for pipe fitting, preventing the pipes from being bent. The unselected pipes are sealed. The air pipe 331 communicates with a fifth air chamber 332 of the second main body 3. The fifth air chamber 332 communicates with the third air chamber 143 through the hole 222 of the membrane plate 2. The third air chamber 143 communicates with the third pipe 13. When in practice, one of the air pipe 331 and the third pipe 13 is selected as an air output for depressurization. The unselected pipe is sealed.

The sensor 4 and the depressurization unit 5 are coupled to the second main body 3. The membrane plate 2 is connected between the first main body 1 and the second main body 3.

Figure 5:
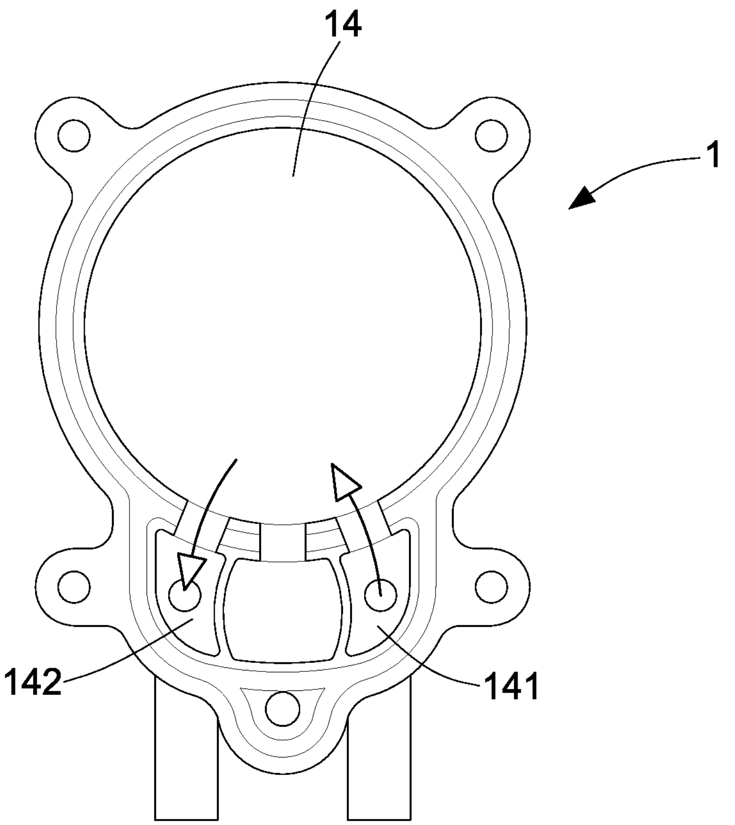
FIG. 5 is a schematic view showing the air flow of the first main body of the present invention.
Figure 6:
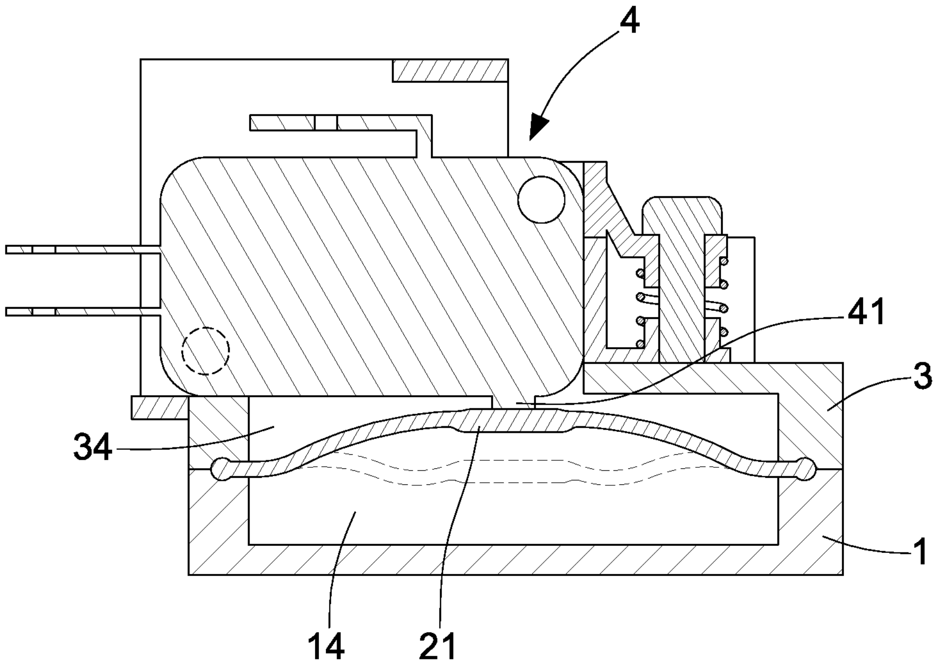
FIG. 6 is a schematic view showing operation of the membrane plate and the sensor of the present invention.
Figure 7:
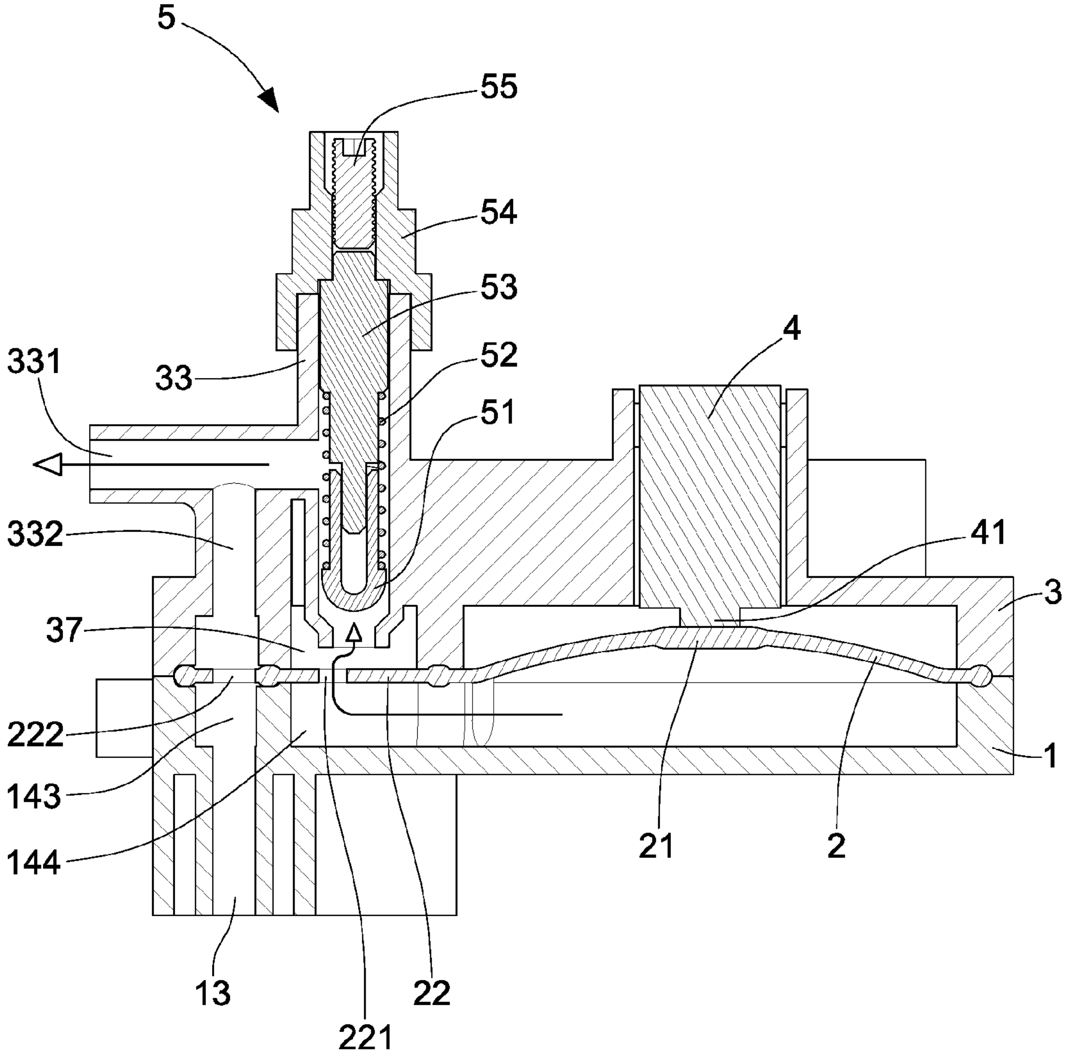
FIG. 7 is a schematic view showing depressurization of the present invention.

When in practice, the first pipe 11 functions as an air input end, namely, the first pipe 11 is connected with an air pump (not shown in the drawings). The second pipe 12 functions as an air output end. When the air enters the first air chamber 141 through the first pipe 11 and flows into the first room 14 (as shown in FIG. 5), the main membrane portion 21 of the membrane plate 2 will be deformed by the saturated air and pressure (as shown in FIG. 6). The central of the deformed main membrane portion 21 will touch the trigger portion 41 of the sensor 4. The trigger portion 41 is retracted by the applied force. The sensor 4 detects the air and sends an electronic signal. Thus, the present invention provides an automatic function to transmit information. After that, partial air flows into the fourth air chamber 144 from the first room 14. The fourth air chamber 144 communicates with a depressurization air chamber 37 through the through hole 221. The depressurization air chamber 37 communicates with the depressurization pipe 33. The air will flow into the depressurization pipe 33, as shown in FIG. 7. The depressurization unit 5 is in the depressurization pipe 33. The depressurization unit 5 comprises the valve body 51 which is biased by the elastic member 52. When the pressure of the air is less than the elastic force of the elastic member 52 applied to the valve body 51, the valve body 51 will be closed. When the pressure of the air is great than the elastic force of the elastic member 52 applied to the valve body 51, the valve body 51 will be pushed away to compress the elastic member 52. The air will be exhausted from the air pipe 331 so as to depressurize.

The output air from the air pipe 33 will be sent to the air pump for reuse, not to the surrounding in order to prevent noise.

In the conventional air cushion bed, the air pipe is always bent for pipe fitting. The air pipe may be damaged or disengaged from the bed. On the contrary, the present invention has interconnected vertical and transverse pipes for air input and output pipes. As shown in FIG. 2 and FIG. 3, the first pipe 11 comprises the first auxiliary pipe 111 which is perpendicular to and communicates with the first pipe 11. The second pipe 12 comprises the second auxiliary pipe 121 which is perpendicular to and communicates with the second pipe 12. The air pipe 331 communicates with the fifth air chamber 332 of the second main body 3. The fifth air chamber 332 communicates with the third air chamber 143 through the hole 222 of the membrane plate 2. The third air chamber 143 communicates with the third pipe 13. For pipe fitting, they can be selected as desired for connection of the pipes.

The first pipe 11 functions as an air input end and the second pipe 12 functions as an air output end, alternatively, the first pipe 11 functions as an air output end and the second pipe 12 functions as an air input end.

The first pipe 11, the second pipe 12 and the third pipe 13 of the present invention can be designed to have a dual-layer joint for stable connection of the pipes. This can prevent the ends of the pipes from breaking or being damaged.

The traditional air pump, the air cushion and the control valve need a three-way connector for air distribution and transfer. The control valve of the present invention has the function of the three-way connector, which is convenient and simple for pipe fitting and assembly. When in practice, the present invention can cooperate with the three-way connector. One of the pipes of the present invention is blocked, and the outer end of the other pipe is connected with the three-way connector to communicate with the air pump and the air cushion bed. In principle, the arrangement of the air pump, the control valve and the air cushion bed is as follows:

1. The air pump, the control valve and the air cushion bed are connected with the three-way connector.
2. The air pump is connected to the control valve alone, and the air pump is connected to the air cushion bed alone.
3. The air pump is connected to the control valve alone, and then the control valve is connected to the air cushion bed alone.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A control valve for an air cushion bed, comprising a first main body, a membrane plate, a second main body and a sensor, and characterized by:

the first main body having a first room therein, the first main body comprising a first pipe, the first pipe communicating with the first air chamber;

the second main body having a second room corresponding to the first room of the first main body, the sensor being disposed in the second room;

the membrane plate located between the first main body and the second main body; and the sensor having a trigger portion, the trigger portion being exposed out of the second room and facing the membrane plate, wherein the first main body has the first room, a first air chamber, a second air chamber and a fourth air chamber which communicate with each other, the first main body comprising the first pipe and a second pipe, the first pipe communicating with the first air chamber, the second pipe communicating with the second air chamber; the second main body having the second room corresponding to the first room of the first main body, the sensor being disposed in the second room, the second main body comprising a depressurization pipe, the depressurization unit being disposed in the depressurization pipe, the depressurization pipe communicating with an air pipe; the membrane plate being located between the first main body and the second main body, the membrane plate comprising a main membrane portion and an extension portion, the main membrane portion being clamped between the first main body and the second main body, the extension portion having a through hole corresponding in position to the fourth air chamber.

2. The control valve as claimed in claim 1, wherein the first main body further has a separate third air chamber which is located close to the fourth air chamber, the third air chamber communicating with a third pipe, the extension portion of the membrane plate further having a hole at an outer end thereof, the hole corresponding in position to the third air chamber, the air pipe communicating with a fifth air chamber of the second main body, the fifth air chamber communicating with the third air chamber through the hole of the membrane plate.

3. The control valve as claimed in claim 1, wherein the first main body has a first annular recess at an inner edge thereof, the second main body having a second annular recess at an inner edge thereof, the membrane plate having an annular press portion around an outer wall thereof, the annular press portion being placed between the first and second annular recesses of the first main body and the second main body.

4. The control valve as claimed in claim 1, wherein the sensor is a micro switch.

5. The control valve as claimed in claim 1, wherein the first pipe comprises a first auxiliary pipe which is perpendicular to the first pipe, and the second pipe comprises a second auxiliary pipe which is perpendicular to the second pipe.

6. The control valve as claimed in claim 1, wherein the first pipe functions as an air input end, and the second pipe functions as an air output end.

7. The control valve as claimed in claim 1, wherein the second pipe functions as an air input end, and the first pipe functions as an air output end.

8. The control valve as claimed in claim 1, wherein the second main body is provided with a depressurization unit, the depressurization unit comprising a valve body, an elastic member, a central post, a fixing sleeve and an adjustment bolt, the adjustment bolt being turned to change the position of the valve body so as to adjust the pressure of depressurization.

* * * * *